Dec. 22, 1959 M. E. HARDY 2,918,289

RETRACTABLE PHONOGRAPH SPINDLE

Filed April 25, 1955 4 Sheets-Sheet 1

MAURICE E. HARDY
INVENTOR.
BY Francis W. Crotty
HIS ATTORNEY.

Dec. 22, 1959 M. E. HARDY 2,918,289

RETRACTABLE PHONOGRAPH SPINDLE

Filed April 25, 1955 4 Sheets-Sheet 2

MAURICE E. HARDY
*INVENTOR.*

BY Francis W. Crotty

HIS ATTORNEY.

MAURICE E. HARDY
*INVENTOR.*

BY Francis W. Crotty

HIS ATTORNEY.

Dec. 22, 1959 | M. E. HARDY | 2,918,289

RETRACTABLE PHONOGRAPH SPINDLE

Filed April 25, 1955 | 4 Sheets-Sheet 4

Normal Position

Rotated Position

MAURICE E. HARDY
*INVENTOR.*

BY Francis W. Crotty

HIS ATTORNEY.

2,918,289

RETRACTABLE PHONOGRAPH SPINDLE

Maurice E. Hardy, Chicago, Ill., assignor to Zenith Radio Corporation, a corporation of Delaware Application April 25, 1955, Serial No. 503,460

12 Claims. (Cl. 274—10)

This invention relates to record players and more particularly to such devices embodying means for reproducing sound from record discs having indexing apertures of different sizes.

Early commercial sales of record discs were principally of the type designed to be played at a speed of 78 revolutions per minute, while a recording and reproducing speed of 33⅓ r.p.m. has long been employed in studio broadcast equipment, because of the requirements of longer playing time. Commercial demand for longer record playing time eventually brought the 33⅓ r.p.m. records to the commercial market, and these records were compatible with the existing spindle structures although it was necessary to provide multi-speed turntable driving systems to accommodate both types of records. But manufacturers subsequently introduced yet another type of record and record player, operating at a speed of 45 r.p.m. and indexed by a spindle having a much larger diameter than that used for other speeds, about 1½" as compared to the original 9/32", and the commercial introduction of these records presented an altogether different problem.

When the 45 r.p.m. record discs appeared on the market, they could not be played on existing reproducers, and this necessitated the employment of a separate record player having a spindle of a size matching that of the indexing aperture of the new records. To permit the use of multi-speed record players with all three types of records, hole adapters or "spiders," having an inner diameter sized to receive the standard 9/32" spindle and an outer diameter adapted to engage the inner periphery of record discs having the larger indexing aperture were devised. As a refinement of this approach, to permit automatic record changing of the 7-inch records, a secondary spindle assembly provided with record changing elements arranged for actuation by the conventional 9/32" center-drop spindle may be manually positioned over the latter spindle of a 3-speed automatic record player. While these expedients provide a partial solution to the problem of reconciling the different record sizes, both the hole adapters and the demountable spindle assembly are awkward and inconvenient to use, and the secondary spindle assembly is easily lost or misplaced and is subject to damage through negligence or the antics of small children.

It is, therefore, an object of this invention to provide a unitary record player with a primary spindle structure for accommodating record discs having a first indexing aperture size, and a secondary spindle structure for accommodating record discs having a second indexing aperture size.

It is a further object of the invention to provide a secondary spindle structure which is fully retractable within the record player in order to expose the primary spindle for playing records of the first type.

It is yet another object of the invention to provide means for selectively locking the retractable spindle structure in a plurality of extended positions.

It is an additional object of the invention to provide, in a unitary structure, means for automatically playing either a stack of record discs of a first indexing aperture size or a stack of record discs of a second indexing aperture size.

Further it is an object of the invention to accomplish all of the foregoing objectives in a record player which is easy and economical to manufacture, durable in use, and faithful in its reproduction.

In accordance with one aspect of the invention, an automatic record player for selectively reproducing information from record discs of a first type having a small indexing aperture and from record discs of a second type having a large indexing aperture comprises a rotatable turntable having an apertured portion and a record-changing and indexing assembly slidably disposed in said apertured portion and positioned coaxially with respect to the turntable for indexing record discs of the second type and sequentially feeding such record discs to the turntable; this assembly is slidable both to an inoperative position in which no portion thereof extends above the turntable, and to an operative position above the turntable. The record player further includes spindle means coaxial with the assembly for indexing record discs of the first type when the assembly is in its inoperative position, and means for releasably locking the record-indexing assembly in its operative position.

The features of the invention which are believed to be novel are set forth with particularity in the appended claims. The invention, together with further objects and advantages thereof, may best be understood by reference to the following description when taken in conjunction with the accompanying drawings, in the several figures of which like reference numerals identify like elements, and in which:

Figure 1:
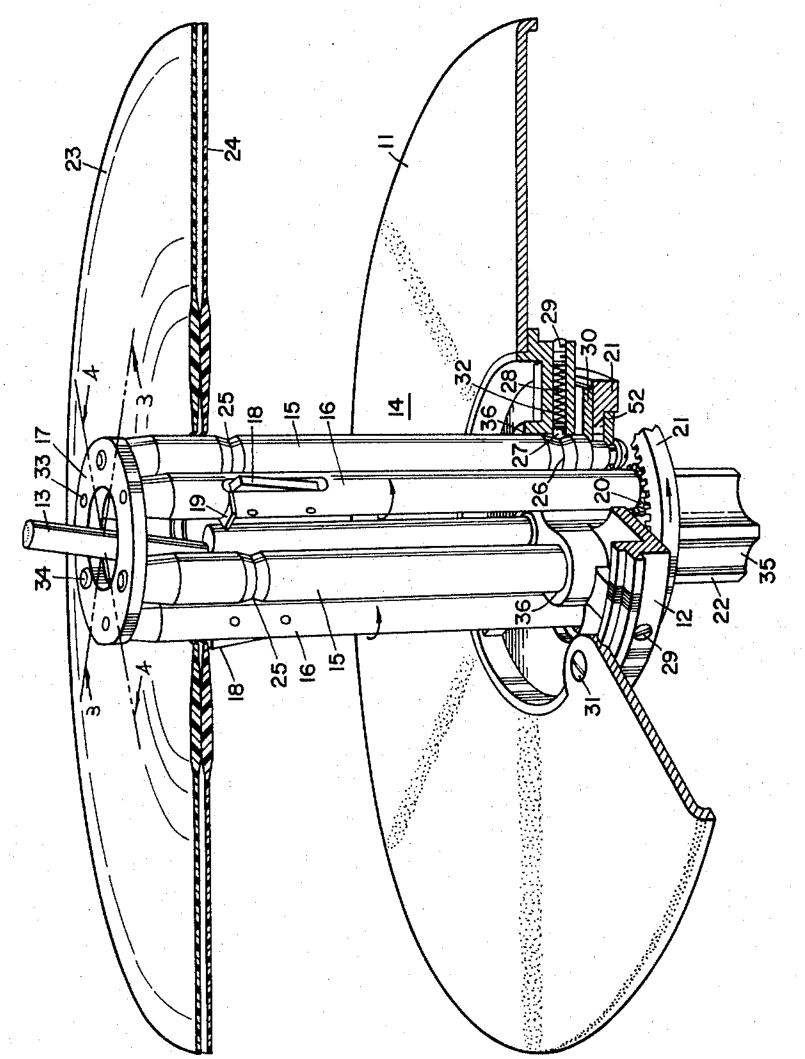
Figure 1 is a fragmentary perspective view, partly in section, of a preferred embodiment of the invention.

The preferred embodiment of Figure 1 includes a turntable 11 mounted on a turntable support 12 by means of bolts 31 of which only one is shown. A conventional center-drop spindle 13 having a diameter of about ¼ inch for accommodating 33⅓ and 78 r.p.m. record discs is fixed to the record player base through a bearing (not shown) in the center of turntable support 12. Spindle 13 is encompassed by a record-indexing assembly 14 which is comprised of three fixed members 15 and three rotatable members 16, positioned as on the diameter of a circle and spaced equidistantly at 60° intervals. A circle constructed tangent to the outermost points of each of fixed members 15 and rotatable members 16 defines the effective circumference of assembly 14, which circumference is slightly smaller than that of the indexing aperture of a 45 r.p.m. record. The upper portions of rotatable members 16 and fixed members 15 are terminated in cylindrical pins or projections 33 and 34, respectively, received in correspondingly sized cylindrical apertures of a top spindle ring 17. Projections 34 of fixed members 15 are peened, thereby spreading the projections and effecting a rigid connection between fixed members 15 and top spindle ring 17. Projections 33 of rotatable members 16 are freely contained for rotation within their corresponding bearing apertures. A retractable shoulder support element 18 is pivotally mounted on, and spring-biased outwardly from, each of rotatable members 16. Two 45 r.p.m. record discs 23 and 24 are supported by shoulder elements 18. On each rotatable member 16 there is also a fixed shelf support 19, displaced approximately 90° circumferentially in a clockwise direction (as viewed from above) from shoulder element 18, and disposed paraxially higher than the upper record-supporting surfaces of shoulder elements 18 by a distance substantially equal to that of the thickest portion of one 45 r.p.m. record disc; in actuality, because of the taper of 45 r.p.m. record discs toward the inner periphery, this distance is approximately one-half that of the thickest portion.

A stiffener element 22 projects from the underside of turntable support 12. Stiffener 22 may be formed either by shaping the lower portion of the same casting or block from which turntable support 12 is cut to the desired form, or by separately forming the two pieces and joining the finished parts. As may be most clearly seen in Figures 2 and 8, stiffener 22 is shaped so that its three outermost surfaces 35 are grooves, positioned parallel to fixed members 15 in such a manner that parts of fixed members 15 are always keyed by and bearing against the contiguous portions of grooves 35. This mating arrangement further secures the rigidity of assembly 14, and prevents backlash when the assembly is in operation. Three cylindrical apertures 36 are cut in turntable support 12 to slidably receive fixed members 15. The diameters of apertures 36 are just sufficient to permit passage of fixed members 15, and therefore provide support for fixed members 15. The effect of the combination of the rigid connection between top spindle ring 17 and projections 34 of fixed members 15, the snug fit between cylindrical apertures 36 and fixed members 15, and the reinforcing action provided by grooves 35 of stiffener element 22 for fixed members 15, is to secure the rigidity of assembly 14 and preclude any possibility of backlash or slippage upon rotation of the turntable assembly.

Fixed members 15 are each provided with two annular grooves or indentations 25 and 26, one near the top and the other placed near the bottom. A small spherical detent element 27, such as an ordinary ball bearing, is confined under pressure within a chamber 32 in turntable support 12 by a spring 28, the compression of which is regulated by an adjustment screw 29. Whenever annular indentations 25 or 26 are positioned opposite detents 27, springs 28 force detents 27 into the indentations, thereby effecting a positive locking arrangement between turntable support 12 and auxiliary spindle assembly 14.

Each of rotatable members 16 has a pinion 20 attached to its lowermost part. A ring gear 21 is disposed to engage all of pinions 20. Ring gear 21 is secured in place by a retainer ring 30, extending under the lower projections of fixed members 15 and over ring gear 21, and by a bottom spindle ring 52, which is positioned below ring gear 21. Three mounting screws (not visible in this view) extend upwardly through bottom spindle ring 52 into the threaded lower portions of fixed members 15, thus securing the bottom portion of assembly 14. These details are shown more clearly in Figure 3.

Figure 2:
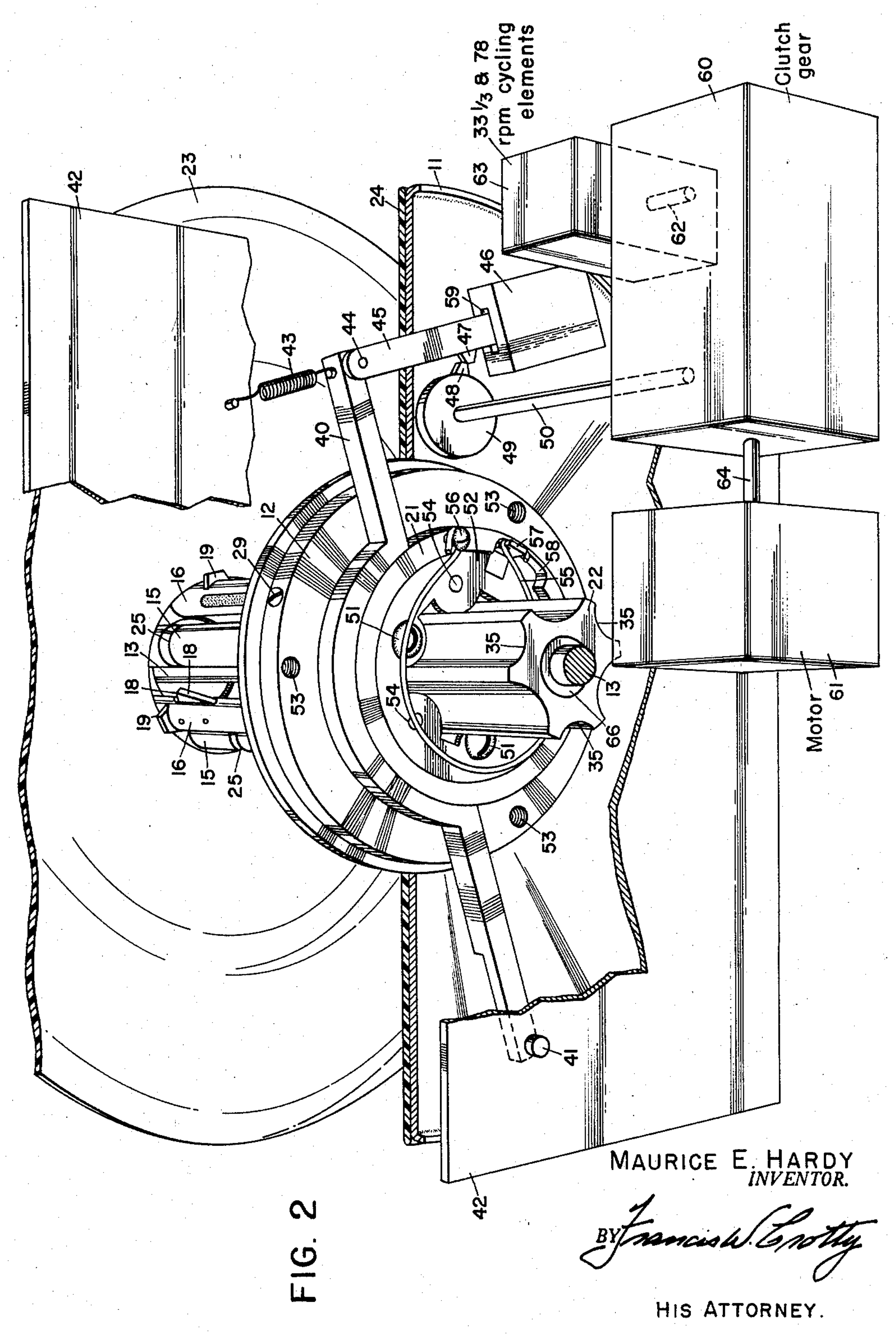
Figure 2 is a fragmentary perspective view, partly schematic and partly in section, of the embodiment shown in Figure 1 as viewed from below.

As shown in Figure 2, a brake 40 is pivotally attached at one end by a rivet 41 to the phonograph motor support or chassis plate 42. The free end of brake 40 is outwardly biased by means of a spring 43 anchored to chassis plate 42; the normal bias applied by spring 43 to brake 40 is sufficient to prevent brake 40 from engaging ring gear 21. The free end of brake 40 is also pivotally fixed by a rivet 44 to a slidable arm 45 engaging a guide block 46. Slidable arm 45 includes a projection or cam follower 47 shaped to be engaged by a tooth 48 of a cam 49. Cam 49 is connected by a shaft 50 to a clutch gear 60 in a well known manner; this mechanism rotates cam 49 once during each record-changing cycle. Clutch gear 60 transmits power from a phonograph motor 61 and shaft 64 through shaft 50 to the 45 r.p.m. record-changing elements described above during every record-changing cycle; clutch gear 60 likewise drives shaft 62 to transmit power to the 33⅓ and 78 r.p.m. record changer elements (shown as block 63) of spindle 13 during the same cycles. The 33⅓ and 78 r.p.m. record changer elements function by physical contact with the outer periphery of ten and twelve inch records; therefore, these elements do not affect the seven inch record discs played at 45 r.p.m.

Mounting screws 51 (only two of which are shown) pass through bottom spindle ring 52 and are threaded into the lowermost portions of fixed members 15. Threaded holes 53 receive mounting screws 31 which secure turntable support 12 to turntable 11. Bottom spindle ring 52 includes bearing recesses 54 into which the lower portions of rotatable members 16 are inserted for rotation in the same manner as pins 33 in the corresponding apertures in top spindle ring 17 (Fig. 1). An arcuate spring 55 (Fig. 2) is secured at one end to a screw 56 which is threaded into ring gear 21, and the other end of spring 55 is fastened to a projection 57 of bottom spindle ring 52. Projection 57 extends downwardly through an arcuate guide slot 58 in ring gear 21. Bearing 66 is positioned around spindle 13 to permit independent rotation of turntable support 12 and stiffener element 22.

Figures 1 and 2 show auxiliary spindle assembly 14 in a position fully extended from turntable 11 and adapted for the automatic playing of 45 r.p.m. records. Turntable 11 is driven by motor 61 (Fig. 2) through means not shown in the drawings but well known in the art. Turntable support 12 and auxiliary spindle assembly 14 (Fig. 1) rotate with turntable 11. Figure 1 depicts the invention with no records on turntable 11, and with two 45 r.p.m. record discs 23 and 24 supported on shoulder elements 18. Upon pressing a "reject" button, or by energizing any other means commonly used in the art to initiate a record-changing cycle, clutch gear 60 (Fig. 2) transmits power through shaft 50, cam 49, and slidable rod 45, to move brake 40 into frictional engagement with ring gear 21. This frictional engagement stops the rotation of ring gear 21 but turntable 11, turntable support 12, and assembly 14 continue to rotate. Thus ring gear 21 is rotated clockwise with respect to turntable 11 (viewed from below in Fig. 2), from a "normal" to a "rotated" position. The amount of rotation is determined by a distance equal to the length of arcuate guide slot 58 minus the width of projection 57; the frictional engagement of brake 40 and ring gear 21 is such that after projection 57 has traveled the length of arcuate guide slot 58, slippage occurs as brake 40 "rides" on the outer circumference of ring gear 21. The length of slot 58 is selected to permit ring gear 21 to drive pinions 20 (Fig. 1) and rotatable members 16 through approximately 90°, from their "normal" to their "rotated" positions, or from the positions shown in Figure 1 to those depicted in Figure 2, during the record-changing cycle. At this time, tooth 48 of cam 49 has rotated sufficiently to disengage projection 47 of slidable arm 45 (Fig. 2). Upon disengagement the biasing force of spring 43 returns brake 40 to its normal position, out of engagement with ring gear 21. Upon this disengagement the biasing force of arcuate spring 55 returns ring gear 21, and therefore pinions 20 and rotatable members 16, from their rotated to their normal positions.

As rotatable members 16 (Fig. 1) are moved through 90° by the engagement of ring gear 21 and brake 40, shoulder support elements 18 are rotated from beneath the inner periphery of lowermost record 24, and shelf support elements 19 are rotated into the space between record discs 23 and 24 at their inner peripheries. Thus record disc 24 is permitted to drop to turntable 11, while shelf support elements 19 uphold record disc 23 and whatever other records might remain on the stack. When brake 40 is released and arcuate spring 55 returns ring gear 21, and therefore rotatable members 16, to their normal positions, shelf supports 19 are rotated out of engagement with the inner periphery of record disc 23, and record disc 23 falls a short distance, until arrested and supported by shoulder support elements 18 at its innermost periphery. This sequence is repeated during each record-changing cycle; shelf supports 19 uphold the penultimate record and all other records of the stack, while the lowermost record is permitted to drop to the turntable. Upon return to their normal position, shelf support elements 19 are withdrawn from engagement with the penultimate record and shoulder elements 18 maintain the record stack in position until the next record-changing cycle. Shoulder elements 18 are pivotally mounted and tapered outwardly from below for automatic retraction as a record stack is removed from turntable 11 after playing. Shelf supports 19 and shoulder supports 18 are shown as separate elements, but they may be of unitary construction if desired, in which event clearances for shelf supports 19 in rotatable members 16 must be provided to permit shelf supports 19 to be displaced with shoulder supports 18 as a record stack is removed from turntable 11.

When assembly 14 is pulled upwardly from its retracted position flush with or below turntable 11, it may be selectively locked in either one of two positions by the engagement of detents 27 with annular detent-receiving indentations 25 or 26. If manual playing of 45 r.p.m. records is desired, assembly 14 is pulled upwardly only a short distance, sufficient to permit indentations 25 to be engaged by detents 27. The spherical detents 27 are then urged into recesses 25 by the action of springs 28, which in turn have their compressive forces adjusted by the positions of adjusting screws 29. If automatic playing of the records is desired, assembly 14 is pulled still farther from its retracted position to permit annular indentations 26 to be engaged by detents 27. The engagements of auxiliary spindle assembly 14 by spring-loaded detents 27 provides a positive indexing means for releasably locking assembly 14 in either of its extended positions. The central portions of annular indentations 25 and 26 are sufficiently deep to insure that the entrance of detents 27 therein provides positive indexing and retains the assembly against gravitational forces. It is also desirable that assembly 14 be movable from either of the indexed positions without the application of a large force. To facilitate such movement, annular indentations 25 are formed with a gradual slope from the deepest, central portion to their outer edges. Such a slope is machined only on the upper portions of annular indentations 26, while the lower portions are finished in a steep lip (best seen in Fig. 3); this configuration prevents the raising of assembly 14 above turntable 11 beyond that distance requisite for the automatic playing of 45 r.p.m. records. Adjusting screws 29 regulate the force which springs 28 apply to detents 27, and thereby govern the force required to disengage auxiliary spindle assembly 14 from either of its indexed positions.

Figure 3:
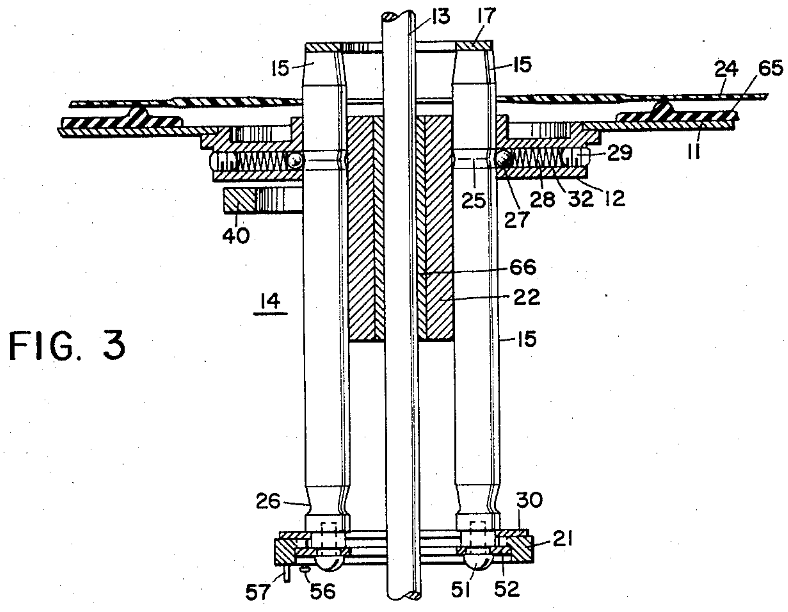
Figure 3 is a fragmentary cross-sectional view, taken along a line similar to line 3—3 of Figure 1 but showing the auxiliary spindle assembly in a partially extended position.
Figure 4:
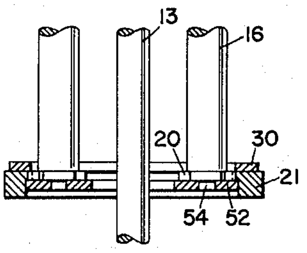
Figure 4 is a fragmentary cross-sectional view similar to that of Figure 3 but taken along a line similar to line 4—4 of Figure 1.

Figure 3 is a sectional view of assembly 14 taken along the line 3—3 in Figure 1, but with assembly 14 extended only a short distance above turntable 11, in the position for manually playing 45 r.p.m. record discs. The rotatable member 16 between and behind members 15 has been omitted from this drawing to better illustrate the operation of fixed members 15. This view clearly shows that brake 40, which is fixed in position, cannot engage ring gear 21 when assembly 14 is indexed in the manual position. Even if a record-changing cycle is initiated with assembly 14 in the manual position, brake 40 cannot interfere with the rotation of assembly 14, but is stopped short of such an interfering engagement when slidable arms 45 (Fig. 2) reaches the end of guide block 46. Figure 3 also shows more clearly the engagement of detents 27 and annular indentations 26. The employment of a rubber cushion 65 between record disc 24 and turntable 11 is optional. The lowermost portion of assembly 14 in the manual position is shown from another aspect in Figure 4.

Figure 5:
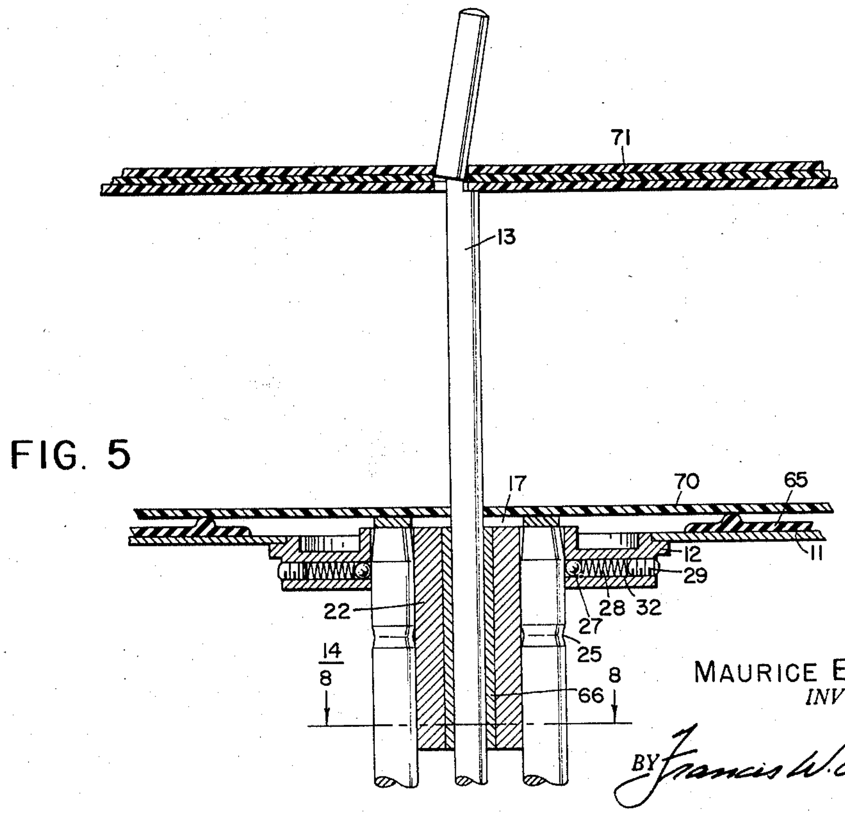
Figure 5 is a view similar to that of Figure 3 showing the auxiliary spindle assembly in a fully retracted position.

Figure 5 is a view similar to that of Figure 3, but shows auxiliary spindle assembly 14 in its fully retracted position. In this position assembly 14 is retracted either flush with or below the upper surface of turntable 11 or rubber cushion 65. No annular indentations are provided in fixed members 15 for positive indexing in this position, because such indexing is unnecessary; the weight of assembly 14 is sufficient to maintain it in its retracted position. For purposes of illustration, a record disc 70, having an indexing aperture size corresponding to that of the 33⅓ or 78 r.p.m. record discs, is shown in this view. A stack 71 of similar record discs is shown supported on the shoulder of spindle 13, in a position to be played automatically. Because the other automatic record changer elements which provide for the sequential feeding and playing of the 33⅓ and 78 r.p.m. records are well known in the art, they are not depicted in these or the other views. It is obvious, however, that with spindle assembly 14 in its fully retracted position, the manual or automatic playing of either 33⅓ or 78 r.p.m. record discs is possible.

Figure 6:
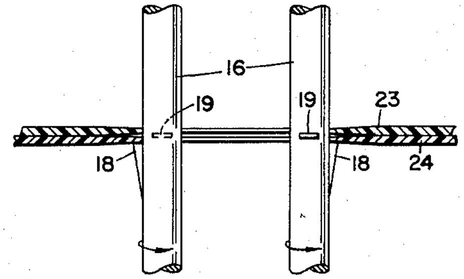
Figures 6 and 7 are fragmentary schematic representations of certain elements of the auxiliary spindle assembly illustrating their operation.
Figure 7:
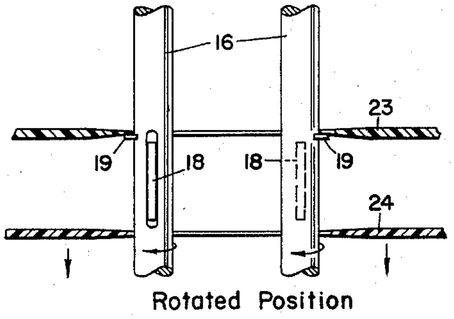

Figures 6 and 7 are partial sequential views of rotatable members 16 which show the function of shoulder elements 18 and shelf elements 19. Spindle 13 and fixed member 15 are not depicted, because they are surplusage when detailing the operation of rotatable members 16. Figure 6 depicts parts of two rotatable members 16, as they appear in their normal positons; shoulder elements 18 support the bottom record of a stack, and shelf elements 19 are positioned 90° away from the inner peripheries of record discs 23 and 24. Figure 7 shows the relative positions of shoulder elements 18 and shelf elements 19 after rotatable members 16 have been moved through approximately 90°, during the record-changing cycle. At this point, shelf elements 19 have been rotated into the space between record discs 23 and 24, and shoulder elements 18 have been withdrawn from contact with the record discs by the rotation of rotatable members 16. As shoulder elements 18 are withdrawn, record disc 24 drops to the turntable, while shelf elements 19 uphold the remainder of the record stack. From this position the assembly is again returned to its normal position, as shown in Figure 6, so that shoulder elements 18 again support the bottom record of the stack (now record disc 23), and shelf elements 19 are now completely withdrawn from contact with the record discs. The identical sequence of operations occurs whenever assembly 14 is in its fully extended, or automatic, position and the record player is driven through a record-changing cycle.

Figure 8:
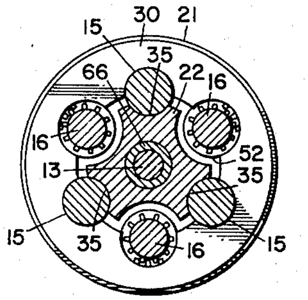
Figure 8 is a sectional view taken along the line 8—8 in Figure 5.

Figure 8 more clearly shows the snug fit between grooves 35 of stiffener element 22 and fixed members 15 of assembly 14, which contributes substantially to the mechanical rigidity and prevents backlash in the auxiliary spindle assembly. Pinions 20 attached to the bottoms of rotatable members 16 are also visible, as are several of the teeth of ring gear 21 which mesh with pinions 20.

Figure 9:
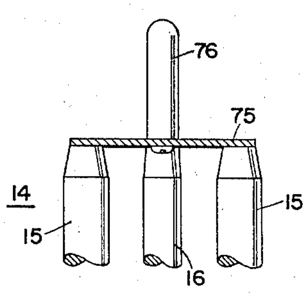
Figure 9 is a fragmentary cross-sectional view, taken along a line similar to line 3—3 of Figure 1, showing another embodiment of the invention.
Figure 10:
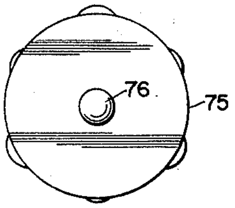
Figure 10 is a top view of the embodiment shown in Figure 9.

Figure 9 portrays another embodiment of the invention in which automatic changer elements are not associated with the spindle used to index 33⅓ and 78 r.p.m. record discs. Shaft 62, and cycling elements 63, which represent the automatic changer elements associated with the 33⅓ and 78 r.p.m. spindle (Fig. 2), are omitted in the embodiment shown in Figure 9, and an upper mounting plate in the form of a solid disc replaces top spindle ring 17 of the first embodiment. A short spindle 76 for indexing 33⅓ and 78 r.p.m. record discs is coaxially affixed to mounting plate 75, or both members may be formed as a unitary construction. Figure 10 is a top view of the embodiment depicted in Figure 9, showing spindle 76 coaxially fastened to disc 75. In this embodiment spindle 76, because it is affixed to disc 75, is moved upwardly or downwardly accordingly as assembly 14 is displaced upwardly or downwardly. In the retracted position, no part of assembly 14 projects above the turntable; spindle 76, however, extends coaxially above the turntable for the manual playing of 33⅓ and 78 r.p.m. record discs. In other respects, the embodiment of Figure 9 may be identical with that of Figures 1–8. When assembly 14 is extended above the turntable, assembly 14 indexes 45 r.p.m. record discs in exactly the same manner shown and described in connection with Figures 1–8, and 45 r.p.m. record discs may be played either manually or automatically. This embodiment finds utility in record players where only the manual playing of 33⅓ and 78 r.p.m. record discs in conjunction with either manual or automatic playing, or both, of 45 r.p.m. record discs is required.

The invention thus provides a novel record player for reproducing information from records of two different indexing aperture sizes, either manually or automatically at will, in a unitary structure without the use of removable adapters either in the records or on the record player, thus providing a maximum of convenience and substantially reducing the possibility of loss of or damage to any part of the mechanism. The auxiliary spindle assembly is fully retractable to permit either 78 or 33⅓ r.p.m. records to be played, or may be selectively extended and releasably locked above the turntable in respective manual and automatic positions for playing 45 r.p.m. records. These objectives have been obtained with a trouble-free, mechanically strong structure, and the entire assembly is simple and economical to manufacture.

While a particular embodiment of the present invention has been shown and described, it is apparent that numerous variations and modifications may be made, and it is therefore contemplated in the appended claims to cover all such variations and modifications as fall within the true spirit and scope of the invention.

I claim:

1. An automatic record player, for selectively reproducing information from record discs of a first type having a small indexing aperture and from record discs of a second type having a large indexing aperture, comprising: a rotatable turntable having an apertured portion; a record-changing and indexing assembly slidably disposed in said apertured portion and positioned coaxially with respect to said turntable for indexing record discs of said second type and sequentially feeding such record discs to said turntable, said assembly being slidable both to an inoperative position in which no portion thereof extends above said turntable and to an operative position above said turntable; record-changing means including a spindle coaxial with said turntable for indexing records of said first type and sequentially feeding such record discs to said turntable when said assembly is in said inoperative position; and means for releasably locking said assembly in said operative position.

2. An automatic record player for reproducing information from two different types of record discs characterized by indexing apertures of different dimensions comprising: a rotatable turntable having an apertured portion; a first record-changing and indexing assembly for sequentially feeding and indexing the first of said two types of record discs in relation to said turntable, including a spindle concentric with and extending above said turntable; a second record-changing and indexing assembly journalled in said apertured portion and disposed coaxially with respect to said first assembly for sequentially feeding and indexing the second of said two types of record discs in relation to said turntable, said second assembly being slidable both to an inoperative position which permits free access of record discs of said first type to said turntable and to an operative position in which said second assembly at least partially encompasses said spindle; and means for releasably locking said second assembly in said operative position.

3. An automatic record player for reproducing information from two different types of record discs characterized by indexing apertures of different dimensions comprising: a rotatable turntable having an apertured portion; a first record-changing and indexing spindle assembly for sequentially feeding and indexing the first of said two types of record discs in relation to said turntable, including a spindle concentric with and extending above said turntable; a second record-changing and indexing spindle assembly journalled in said apertured portion and disposed coaxially with respect to said first assembly for sequentially feeding and indexing the second of said two types of record discs in relation to said turntable, said second assembly being slidable both to an inoperative position which permits free access of record discs of said first type to said turntable and to an operative position in which said second assembly at least partially encompasses said spindle; means for releasably locking said second assembly in said operative position; and means for effecting said sequential feeding of record discs by said first and second assemblies, said second assembly being disengaged from said sequential feeding means upon movement of said second assembly to said inoperative position.

4. An automatic record player for reproducing information from record discs characterized by centrally disposed indexing apertures of predetermined dimensions comprising: a rotatable turntable; a record-indexing assembly for indexing said record discs including a plurality of fixed elements and a plurality of rotatable elements, a plurality of pinions respectively fixed to said rotatable elements, a ring gear in operative engagement and said pinions, a plurality of shoulder elements respectively disposed on said rotatable elements having a normal position in which said shoulder elements engage the inner periphery of the lowermost record of a stack of said record discs and displaceable upon rotation of said rotatable elements to an operated position in which said shoulder elements are withdrawn from the path of travel of records from said stack to said turntable, and a plurality of shelf support elements respectively fixed to said rotatable elements, displaced paraxially from said shoulder elements a distance substantially equal to the thickness of one of said record discs, and displaced circumferentially from said shoulder elements such that, in said normal position of said rotatable elements said shelf support elements are free of the path of travel of record discs from said stack to said turntable, and in said operated position of said rotatable elements said shelf support elements engage the inner periphery of the penultimate record disc of said stack; means for rotating said ring gear with respect to said turntable from a first position corresponding to said normal position of said rotatable elements to a second position corresponding to said operated position of said rotatable elements; and biasing means normally urging said ring gear to said first position.

5. An automatic record player for selectively reproducing information from record discs of a first type having a small indexing aperture and from record discs of a second type having a large indexing aperture comprising: a rotatable turntable; and a record-indexing assembly for indexing record discs of said second type including a plurality of fixed elements and a plurality of rotatable elements, a plurality of pinions respectively fixed to said rotatable elements, a ring gear in operative engagement with said pinions, a plurality of shoulder elements respectively disposed on said rotatable elements having a normal position in which said shoulder elements engage the inner periphery of the lowermost record of a stack of said second type of record discs and displaceable upon rotation of said rotatable elements to an operated position in which said shoulder elements are withdrawn from the path of travel of record discs from said stack to said turntable, and a plurality of shelf support elements respectively fixed to said rotatable elements, displaced paraxially from said shoulder elements a distance substantially equal to the thickness of one of said second type of record discs, and displaced circumferentially from said shoulder elements such that, in said normal position of said rotatable elements said shelf support elements are free of the path of travel of records from said stack, to said turntable, and said operated position of said rotatable elements said shelf support elements engage the inner periphery of the penultimate record disc of said stack; means for rotating said ring gear with respect to said turntable from a first position corresponding to said normal position of said rotatable elements to a second position corresponding to said operated position of said rotatable element, biasing means normally urging said ring gear to said first position; said assembly being retractable to an inoperative position in which no portion thereof extends above said turntable; and spindle means coaxial with said assembly for indexing record discs of said first type when said assembly is in said inoperative position.

6. In an automatic record player: a turntable; a record-indexing assembly for sequentially feeding a stack of record discs to said turntable comprising a plurality of fixed elements and a plurality of rotatable elements, a plurality of pinions respectively fixed to said rotatable elements, a ring gear in operative engagement with said pinions, a plurality of shoulder elements respectively disposed on said rotatable elements having a normal position in which said shoulder elements engage the inner periphery of the lowermost disc of said stack and having an operated position in which said shoulder elements are withdrawn from the path of travel of record discs from said stack to said turntable and a plurality of shelf support elements respectively fixed to said rotatable elements, displaced paraxially from said shoulder elements a distance substantially equal to the thickness of one of said discs and displaced circumferentially from said shoulder elements by substantially 90 degrees, whereby in said normal position of said rotatable elements such shelf support elements are free of the path of travel of record discs from said stack to said turntable and in said operated position of said rotatable elements said shelf support elements engage the inner periphery of the penultimate disc of said stack; means for rotating said ring gear with respect to said record-indexing assembly from a first position corresponding to said normal position of said rotatable elements to a second position corresponding to said operated position of said rotatable elements; and biasing means normally urging said ring gear to said first position.

7. In an automatic record player: a turntable; a record-indexing assembly for sequentially feeding a stack of record discs to said turntable comprising a top spindle ring, a bottom spindle ring, a plurality of fixed elements and a plurality of rotatable elements, disposed between said top and bottom spindle rings, a plurality of pinions respectively fixed to said rotatable elements, a ring gear in operative engagement with said pinions, a plurality of shoulder elements respectively disposed on said rotatable elements having a normal position in which said shoulder elements engage the inner periphery of the lowermost disc of said stack and having an operated position in which said shoulder elements are withdrawn from the path of travel of record discs from said stack to said turntable, and a plurality of shelf support elements respectively fixed to said rotatable elements, displaced paraxially from said shoulder elements a distance substantially equal to the thickness of one of said discs and displaced circumferentially from said shoulder elements by substantially 90 degrees, whereby in said normal position of said rotatable elements said shelf support elements are free of the path of travel of record discs from said stack to said turntable and in said operated position of said rotatable elements said shelf support elements engage the inner periphery of the penultimate disc of said stack; means for rotating said ring gear with respect to said record-indexing assembly from a first position corresponding to said normal position of said rotatable elements to a second position corresponding to said operated position of said rotatable elements; a retainer plate mounted above said ring gear for maintaining said ring gear in operative engagement with said pinions; detent means for releasably locking said assembly in any of a plurality of predetermined positions; and biasing means comprising an arcuate spring disposed between said ring gear and said bottom spindle ring for normally urging said ring gear to a normal position corresponding to said normal position of said rotatable elements.

8. An automatic record player for reproducing information from two different types of record discs characterized by indexing apertures of different dimensions comprising: a rotatable turntable having an apertured portion; a spindle, for indexing the first of said two types of record discs in relation to said turntable, extending above said turntable; a record-changing and indexing assembly journalled in said apertured portion and disposed coaxially with respect to said spindle for sequentially feeding and indexing the second of said two types of record discs in relation to said turntable, said assembly beig slidable to an inoperative position which permits free access of record discs of said first type to said turntable, and being selectively slidable to either of two operative positions at least partially encompassing said spindle for providing manual and automatic feeding, respectively, of record discs of said second type to said turntable; and means for releasably locking said assembly in either of said operative positions.

9. An automatic record player for selectively reproducing information from record discs of a first type having a small indexing aperture and from record discs of a second type having a large indexing aperture comprising: a rotatable turntable having an apertured portion; a record-changing and indexing assembly journalled in said apertured portion and disposed coaxially with respect to said turntable, having transversely projecting elements disposed near one end thereof and manipulatable for sequentially feeding and indexing record discs of said second type in relation to said turntable, said assembly being slidable to an inoperative position in which no portion thereof extends above said turntable and being selectively slidable to either of two operative positions above said turntable in one such position said elements are below said turntable and in the other position said elements are above said turntable for providing manual and automatic feeding, respectively, of record discs of said second type to said turntable; spindle means coaxial with said assembly for indexing record discs of said first type with respect to said turntable when said assembly is in said inoperative position; and means for releasably locking said assembly in either of said operative positions.

10. A record changer for record discs characterized by centrally disposed indexing apertures comprising: an assembly for vertically supporting a stack of record discs and releasing them singly, including a plurality of rotatable elements displaceable between a normal and an operated position; a plurality of shoulder elements respectively fixed to said rotatable elements so that when said rotatable elements are in said normal position said shoulder elements engage the inner periphery of the lowermost record of said stack of record discs and rotatably displaceable, upon rotation of said rotatable elements to said operated position, to a position in which said shoulder elements are withdrawn from the path of travel of records released from said stack; a plurality of shelf support elements respectively fixed to said rotatable elements, spaced axially from said shoulder elements a distance substantially equal to the thickness of one of said record discs, and displaced circumferentially from said shoulder elements such that, in said normal position of said rotatable elements, said shelf elements are free of the path of travel of record discs from said stack while in said operated position of said rotatable elements said shelf elements engage the inner periphery of the penultimate record disc of said stack; and means for rotating said rotatable elements in unison between said normal and said operated positions.

11. A record changer for record discs characterized by centrally disposed indexing apertures comprising: an assembly for vertically supporting a stack of record discs and releasing them singly, including a plurality of rotatable elements displaceable between a normal and an operated position; a plurality of shoulder elements respectively fixed to said rotatable elements so that when said rotatable elements are in said normal position said shoulder elements engage the inner periphery of the lowermost record of said stack of said record discs and rotatably displaceable, upon rotation of said rotatable means to said operated position, to a position in which said elements are withdrawn from the path of travel of records released from said stack; a plurality of shelf support elements respectively fixed to said rotatable elements, spaced axially from said shoulder elements a distance substantially equal to the thickness of one of said record discs, displaced circumferentially from said shoulder elements such that in said normal position of said rotatable elements said shelf elements are free of the path of travel of record discs from said stack while in said operated position of said rotatable elements said shelf elements engage the inner periphery of the penultimate record disc of said stack, the angular displacement of said shelf elements being such that as said rotatable elements are rotated said shelf elements are disposed in the path of travel of said records stack prior to the displacement of said shoulder elements from said path; and means for rotating said rotatable elements in unison between said normal and said operated position.

12. A record changer for record discs characterized by centrally disposed indexing apertures comprising: an assembly for vertically supporting a stack of record discs and releasing them singly including a plurality of vertical and rotatable elements displaceable between a normal and an operated position; a plurality of shoulder elements respectively fixed to said rotatable elements so that when said rotatable elements are in said normal position said shoulder elements engage the inner periphery of the lowermost record of said stack of said record discs and rotatably displaceable, upon rotation of said rotatable elements to said operated position, to a position in which said shoulder elements are withdrawn from the path of travel of records released from said stack; a plurality of shelf support elements respectively fixed to said rotatable elements, spaced axially from said shoulder elements a distance substantially equal to the thickness of one of said record discs, and displaced circumferentially from said shoulder elements such that in the normal position of said rotatable elements said shelf elements are free of the path of travel of record discs from said stack while in said operated position of said rotatable elements said shelf elements engage the inner periphery of the penultimate record disc of said stack; and gear means associated with each of said rotatable elements, including a common driver for engaging said gear means, for moving said elements between their said normal and operated positions.

References Cited in the file of this patent

UNITED STATES PATENTS

| | | |
|---|---|---|
| 1,440,276 | Cerveny | Dec. 26, 1922 |
| 2,319,945 | Osborne et al. | May 25, 1943 |
| 2,397,932 | Erwood et al. | Apr. 9, 1946 |
| 2,634,135 | Carson | Apr. 7, 1953 |
| 2,643,127 | Gregg et al. | June 23, 1953 |
| 2,666,648 | Dale | Jan. 19, 1954 |
| 2,693,364 | Chalfin | Nov. 2, 1954 |
| 2,762,627 | Johnson | Sept. 11, 1956 |

FOREIGN PATENTS

| | | |
|---|---|---|
| 680,810 | Great Britain | Oct. 15, 1952 |